United States Patent
Sweeney et al.

(10) Patent No.: US 10,703,382 B2
(45) Date of Patent: Jul. 7, 2020

(54) SELF-DRIVING DELIVERY OF OPTIONALLY-DRIVEN VEHICLES

(71) Applicant: UATC, LLC, San Francisco, CA (US)

(72) Inventors: Matthew Sweeney, Pittsburgh, PA (US); Anthony Levandowski, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 57 days.

(21) Appl. No.: 15/596,046

(22) Filed: May 16, 2017

(65) Prior Publication Data

US 2018/0335783 A1    Nov. 22, 2018

(51) Int. Cl.
    *B60W 50/08*      (2020.01)
    *G06Q 50/30*      (2012.01)
    *B60W 30/14*      (2006.01)

(52) U.S. Cl.
    CPC ........ *B60W 50/085* (2013.01); *B60W 30/146* (2013.01); *G06Q 50/30* (2013.01)

(58) Field of Classification Search
    CPC .. G05D 1/0212; G05D 1/0061; G05D 1/0088; G05D 1/0214; G05D 1/0242; G05D 1/0246; G05D 1/0257; G06Q 50/30
    See application file for complete search history.

(56) References Cited

U.S. PATENT DOCUMENTS

| | | | | |
|---|---|---|---|---|
| 2014/0303827 A1* | 10/2014 | Dolgov | ................. | B60W 30/00 701/23 |
| 2015/0253778 A1* | 9/2015 | Rothoff | ............... | G05D 1/0088 701/25 |
| 2016/0092976 A1* | 3/2016 | Marusyk | ............ | G06Q 30/0645 705/307 |
| 2016/0171637 A1* | 6/2016 | Rai | ......................... | H04L 67/12 705/13 |
| 2017/0102700 A1* | 4/2017 | Kozak | ................... | B60W 30/00 |
| 2017/0262790 A1* | 9/2017 | Khasis | ................ | G05D 1/0287 |
| 2017/0314950 A1* | 11/2017 | Tian | ................... | G01C 21/3484 |
| 2018/0096606 A1* | 4/2018 | Moreira-Matias | ..... | G08G 1/202 |
| 2018/0284774 A1* | 10/2018 | Kawamoto | ........... | B60W 50/10 |
| 2019/0047580 A1* | 2/2019 | Kwasnick | ......... | B60W 50/0205 |
| 2019/0051174 A1* | 2/2019 | Haque | .................... | G01C 21/34 |

* cited by examiner

*Primary Examiner* — Aaron L Troost
(74) *Attorney, Agent, or Firm* — Dority & Manning, P.A.

(57) ABSTRACT

The present disclosure provides systems and methods for operating autonomous vehicles. In one example embodiment, the method includes receiving an instruction for an autonomous vehicle to autonomously travel in an autonomous mode from a first location to a second location. When operating in the autonomous mode, the autonomous vehicle is restricted to operating within a limited operating envelope. The method includes receiving data indicative of a request by a human operator to operate the autonomous vehicle. In response to receiving the data indicative of the request by the human operator to operate the autonomous vehicle, the method includes authorizing the autonomous vehicle for operation by a human operator in a non-autonomous mode outside of the limited operating envelope. The limited operating envelope limits at least one operating capability of the autonomous vehicle based at least in part on an operating limit associated with an autonomous system for the autonomous vehicle.

20 Claims, 6 Drawing Sheets

SELF-DRIVING DELIVERY OF OPTIONALLY-DRIVEN VEHICLES

FIELD

The present disclosure relates generally to autonomous vehicles.

BACKGROUND

An autonomous vehicle is a vehicle that is capable of sensing its environment and navigating with little or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a method for operating an autonomous vehicle. The method includes receiving, by one or more processors, an instruction for an autonomous vehicle to autonomously travel in an autonomous mode from a first location to a second location. When operating in the autonomous mode, the autonomous vehicle is restricted to operating within a limited operating envelope. After the autonomous vehicle arrives at the second location, the method includes receiving, by the one or more processors, data indicative of a request by a human operator to operate the autonomous vehicle. In response to receiving the data indicative of the request by the human operator to operate the autonomous vehicle, the method includes authorizing, by the one or more processors, the autonomous vehicle for operation by a human operator in a non-autonomous mode outside of the limited operating envelope. The limited operating envelope limits at least one operating capability of the autonomous vehicle based at least in part on an operating limit associated with an autonomous system for the autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
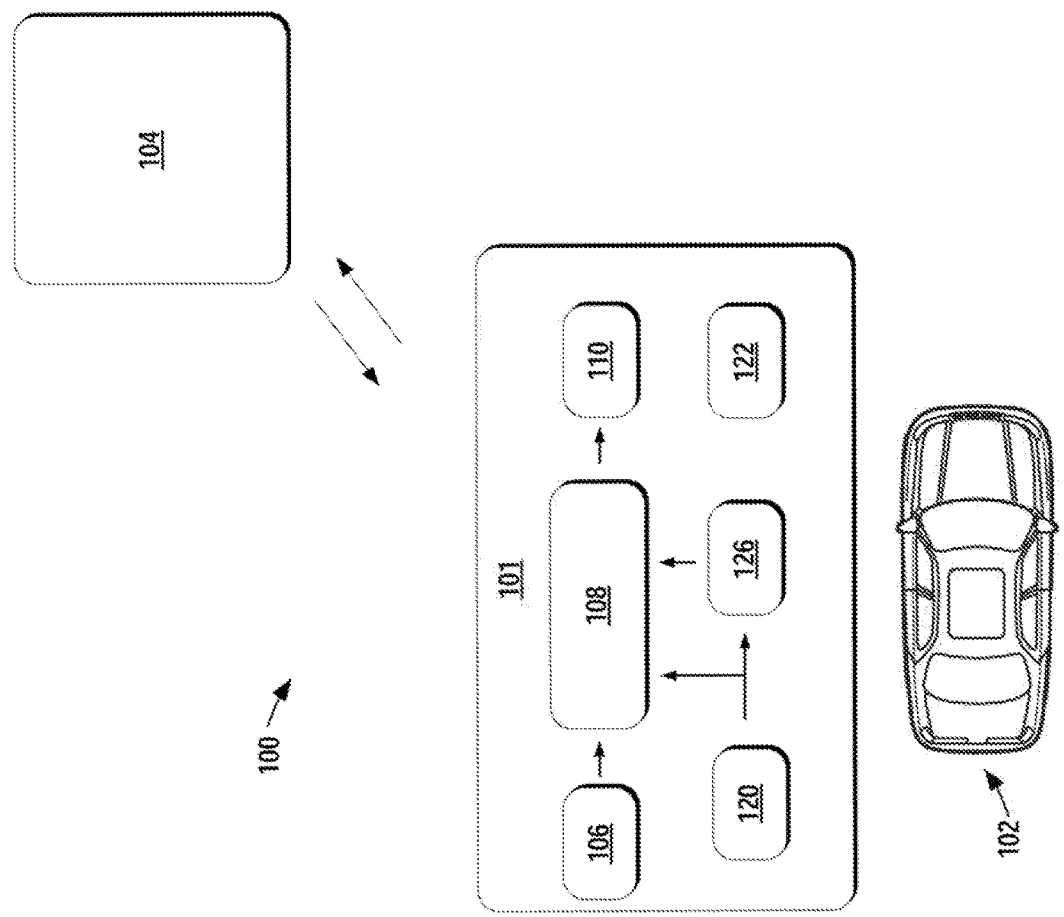
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to control of autonomous vehicles and more particularly to control of autonomous vehicles that are capable of being driven by a human operator. Human operators can operate vehicles for a variety of purposes. In many cases, a vehicle may not be located proximate to a human operator for use in driving to an intended destination.

Autonomous vehicles can be equipped with autonomous systems that allow the autonomous vehicles to drive, navigate, operate, etc. with no interaction from a human operator. Autonomous systems can be used to automatically navigate vehicles to locations proximate to human operators. Once a vehicle is at a location proximate the human operator, the human operator can enter the vehicle and drive the vehicle to an intended destination.

In some instances, certain vehicles may be equipped with autonomous systems with reduced or limited operating capability. For instance, vehicles may be equipped with an autonomous system that only provides the ability to travel autonomously at reduced speeds (e.g., less than 10 miles per hour), with reduced travel maneuvers, with limited types of maneuvers (e.g., no U-turns, no lane changes, limited reverse, etc.), and/or over a reduced travel distance. These vehicles can include simpler (e.g., less complex) autonomous systems. The simpler autonomous systems can include, for instance, a fewer number of sensors, less processing resources, simplified control systems, etc., relative to autonomous systems without reduced operating capability. The simplified autonomous systems can be significantly cheaper and more economical to implement relative to more complex autonomous systems with increased operating capability.

According to example aspects of the present disclosure, autonomous vehicles with limited operating capability can be used to "self-deliver" themselves to locations proximate an intended human operator or other location (e.g., a service location). Once the autonomous vehicle has arrived at an intended location, the vehicle can be accessed by the human operator and manually driven to an intended destination. When the human operator is finished with the vehicle, the vehicle can then autonomously drive itself to another destination, such as a destination proximate another human operator or other specified destination (e.g., a defined home location for the vehicle).

In some embodiments, an autonomous vehicle can receive an instruction to enter into an autonomous mode. When in the autonomous mode, the autonomous vehicle can travel autonomously to an intended destination. The autonomous vehicle can be restricted to operation within a limited operating envelope when operating in the autonomous mode. The limited operating envelope can limit at least one operating capability of the autonomous vehicle. For instance, the limited operating envelope can restrict at least one of a travel speed, a number of travel maneuvers, a type of travel maneuver, or a travel distance of the autonomous vehicle.

When a human operator accesses the autonomous vehicle, the vehicle can authorize the human operator to operate the vehicle in a non-autonomous mode outside of the limited operating envelope. For instance, the autonomous vehicle can receive data indicative of a request by a human operator to operate the vehicle. The data indicative of the request can be, for instance, data indicating a human operator has entered the vehicle, data indicating that a human operator has started the vehicle, data received as a result of a user input via an interface, etc. In response to receiving the data, the autonomous vehicle can be authorized for human operation in a non-autonomous mode outside the limited operating envelope. For example, the human operator can operate the vehicle at travel speeds that are greater than those implemented by the autonomous system when operating within the limited operating envelope. In this way, the vehicle can be suitable for more natural operation by a human operator.

In some implementations, the limited operating envelope can restrict operation of the autonomous vehicle based on an operating limit associated with an autonomous system for the autonomous vehicle. As an example, a certain type of an autonomous system may only be able to control a vehicle to travel autonomously at a maximum speed of, for instance, about 10 miles per hour. The limited operating capability can be a result of, for instance, fewer sensors or other resources (e.g., processing resources) associated with the autonomous system. In this example, the limited operating envelope can restrict the travel speed of the vehicle to about 10 miles per hour or less. When a human operator accesses the vehicle, the human operator can operate the vehicle at speeds in excess of 10 miles per hour.

In some embodiments, the limited operating envelope can specify a limited time window during which the autonomous vehicle can travel autonomously. The limited time window can be determined, for instance, to reduce impact or effect on traffic patterns, public use, or other activity for the geographic area. For example, a time window can be determined to occur late in the evening, very early in the morning, and/or other time associated with reduced activity (e.g., traffic activity) so that the autonomous vehicle can travel to a new location as part of the reallocation with minimal impact on the geographic area, even when operating within the limited operating envelope.

In some embodiments, a limited time window specified as part of a limited operating envelope can be determined based at least in part on one or more environmental parameters associated with the geographic area. The environmental parameters can include any parameter that can have an effect on travel and/or transportation in the geographic area. For instance, the time window can be determined based at least in part on environmental parameter(s) such as time of day, traffic patterns, weather, pedestrian traffic, terrain, events, etc. In this way, a vehicle with limited autonomous capability can be controlled to travel autonomously only during time windows associated with reduced activity or at times otherwise suitable for autonomous travel.

One example application of the present technology is implementation of a vehicle sharing service using autonomous vehicles. A vehicle sharing service can provide a distribution of a plurality of vehicles at different locations throughout a service area, such as a city, county, state, or other geographic area. A user can access the vehicle at one of the plurality of different locations and drive the vehicle for a period of time to an intended destination. The user can leave the vehicle at or near the intended destination. The vehicle can then be accessed by a next user of the vehicle sharing service or other driver.

According to some example embodiments, the vehicle sharing service can leverage the autonomy of a plurality of autonomous vehicles to periodically reallocate at least a subset of the plurality of vehicles used for the vehicle sharing service to achieve a desired distribution of vehicles across the geographic area. For instance, one or more vehicles can autonomously travel from a drop off location of a previous user to a location that is more suitable for pickup by a next user of the vehicle sharing service, such as a location closer to a mass transit station or closer to a location associated with the next user of the vehicle (e.g., a particular user's home or place of work). In some implementations, the vehicle can autonomously travel to a service location for maintenance and/or servicing.

In some embodiments, the vehicle sharing service can be implemented with autonomous vehicles having autonomous systems with limited operating capability. As a result, in example embodiments, the reallocation of autonomous vehicles for the vehicle sharing service can occur during a time window determined, for instance, to reduce impact or effect on traffic patterns, public use, or other activity for the geographic area. Because the reallocation occurs during time windows associated with reduced activity, vehicles with limited autonomous systems can slowly travel to their intended destination as part of the reallocation without much disruption in traffic patterns or public use of spaces in the geographic area.

In some embodiments, the reallocation can be performed by obtaining data indicative of a desired vehicle allocation for a plurality of vehicles in the ride sharing service. An allocation time window for one or more autonomous vehicles in the ride sharing service can be determined, for instance, by a remote operations computing system or other computing system. Instructions to control autonomous vehicles to implement the reallocation can be determined for each of the autonomous vehicles based at least in part on the desired vehicle allocation and the allocation time window. The instructions can be communicated to the autonomous vehicles (e.g., over a network). The instructions can control the autonomous vehicles to travel at least partially to their intended destinations specified as part of the vehicle allocation during the allocation time window.

In some embodiments, the vehicle allocation can be determined based at least in part on data indicative of operating limits of autonomous systems equipped onto autonomous vehicles used as part of the vehicle sharing service. For instance, the vehicle allocation can take into account the limited travel capability of some autonomous vehicles in determining an intended location for the autonomous vehicle. As an example, the vehicle allocation can take into account that an autonomous vehicle may only reasonably travel a few miles in a given time window due to the ability to only travel at reduced speeds and/or with limited maneuvers (e.g., no U-turns, no lane changes, etc.). As another example, the vehicle allocation can take into account that the autonomous vehicle may only be able to travel over certain limited navigation routes to reach an intended destination.

In some embodiments, the allocation time window can be determined based at least in part on one or more environmental parameters associated with the geographic area. For instance, the allocation time window can be determined based at least in part on environmental parameter(s) such as time of day, traffic patterns, weather, pedestrian traffic, terrain, events, etc. For example, the allocation time window can be selected such that the allocated vehicles are not travelling during an ice storm or other dangerous conditions.

In addition and/or in the alternative, the allocation time window can be determined based at least in part on operating limits associated with the autonomous vehicles, such as travel speed limits, etc. The allocation time window can be determined to implement the reallocation at times suitable for the autonomous vehicles to travel (e.g., with limited operating capability) with reduced impact on the geographic area.

Aspects of the present disclosure are discussed with reference to implementation of a vehicle sharing service for purposes of illustration and discussion. Those of ordinary skill in the art, using the disclosures provided herein, will understand that aspects of the present disclosure can be used to implement delivery of autonomous vehicles for human operators in a variety of other applications without deviating from the scope of the present disclosure.

Example aspects of the present disclosure can provide a number of technical effects and benefits. For instance, the systems and methods according to aspects of the present disclosure can process data to generate instructions for controlling one or more autonomous vehicles to operate within a limited operating envelope. In this way, vehicles can travel autonomously to intended destinations with reduced travel maneuvers and/or at reduced speed. As a result, processing and storage resources of the autonomous vehicles dedicated to autonomous travel can be used or reserved, for instance, for improving core functions of the autonomous vehicle. Moreover, less complex autonomous systems can be used to implement the self-delivery of autonomous vehicles according to example embodiments of the present disclosure. When accessed by a human operator, the vehicle can be operated outside the limited operating envelope so that operation is more natural for the human operator.

Example systems and methods of the present disclosure provide an improvement to autonomous vehicle computing technology. For instance, the systems and methods can determine a limited operating envelope for controlling autonomous vehicles to travel to intended destinations. The limited operating envelope can include a limited time window determined to occur at a time where the autonomous vehicle can travel with minimal impact on the geographic area. As a result, autonomous vehicles with reduced autonomous capability (e.g., speed limits of less than 10 mph, strict maneuver limits, etc.) can be used to implement autonomous travel. In some implementations, limited operating envelope determinations can be performed by one or more processors remotely from the autonomous vehicle, reducing the computational resources required by the autonomous vehicle for use in implementing autonomous travel.

As used herein, the singular forms "a," "an," and "the" include plural unless the context clearly dictates otherwise. The use of the term "about" in conjunction with a numerical value refers to within 20% of the stated amount. The terms "first", "second", and "third" may be used interchangeably to distinguish one component from another and are not intended to signify location, order, or importance of the individual components. "Obtaining" data can include receiving, determining, calculating, accessing, reading or otherwise obtaining data.

With reference now to the FIGS., example embodiments of the present disclosure will be discussed in further detail. FIG. 1 depicts an example system 100 according to example embodiments of the present disclosure. The system 100 can include an autonomous system 101 associated with a vehicle 102 and an operations computing system 104 that is remote from the vehicle 102. FIG. 1 depicts one example autonomous vehicle system according to example embodiments of the present disclosure. Those of ordinary skill in the art, using the disclosures provided herein, will understand that aspects of the present disclosure can be implemented with other autonomous vehicle systems without deviating from the scope of the present disclosure.

The vehicle 102 incorporating the autonomous system 101 can be a ground-based autonomous vehicle (e.g., car, truck, bus) or other type of vehicle. The vehicle 102 can be an autonomous vehicle that can, in certain modes of operation, drive, navigate, operate, etc. with minimal and/or no interaction from a human driver. For example, the vehicle 102 can operate semi-autonomously with some interaction from a human driver present in the vehicle 102. The vehicle 102 can be configured to operate in a fully autonomous manner (e.g., self-driving manner) such that the vehicle 102 can drive, navigate, operate, etc. with no interaction from a human driver. The vehicle 102 can be configured to operate in a non-autonomous manner such that the vehicle is driven by a human driver with little to no assistance from an autonomous system.

As shown in FIG. 1, the vehicle 102 can include one or more data acquisition systems 106, an autonomous computing system 108, and one or more vehicle control systems 110. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The data acquisition system(s) 106 can be configured to obtain sensor data associated with one or more objects that are proximate to the vehicle 102 (e.g., within a field of view of one or more of the data acquisition system(s) 106). The data acquisitions system(s) 106 can include, for instance, a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data can include image data, radar data, LIDAR data, and/or other data acquired by the data acquisition system(s) 106. The object(s) can include, for example, pedestrians, vehicles, bicycles, and/or other objects. The object(s) can be located in front of, to the rear of, and/or to the side of the vehicle 102. The sensor data can be indicative of locations associated with the object(s)

within the surrounding environment of the vehicle 102 at one or more times. The data acquisition system(s) 106 can provide the sensor data to the autonomous computing system 108.

In addition to the sensor data, the autonomous computing system 108 can retrieve or otherwise obtain map data associated with the surroundings of the vehicle 102. The map data can provide detailed information about the surrounding environment of the vehicle 102. For example, the map data can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 102 in comprehending and perceiving its surrounding environment and its relationship thereto.

The autonomous computing system 108 can receive the sensor data from the data acquisition system(s) 106, comprehend the surrounding environment by performing various processing techniques on data collected by the data acquisition system(s) 106, and generate an appropriate motion plan through such surrounding environment. The autonomous computing system 108 can control the one or more vehicle control systems 110 to operate the vehicle 102 according to the motion plan.

The vehicle 102 can include one or more vehicle component sensors 120 associated with various vehicle components. The vehicle component sensor(s) 120 can include load/weight sensors, audio sensors, temperature sensors, vibration sensors, motion sensors, and/or other types of sensors that are configured to detect a change in status associated with a vehicle component. The autonomous computing system 108 can be configured to determine a motion plan for the vehicle 102 based at least in part on the one or more signals from the vehicle component sensors 120.

In some embodiments, the autonomous computing system 108 can be a simplified autonomous system with limited operating capability. For instance, in some embodiments, due to fewer sensors, fewer processing resources, simplified processing modules, etc., the autonomous computing system 108 can only control the vehicle 102 to travel at reduced speeds (e.g., less than about 10 miles per hour), with limited travel maneuvers (e.g., no U-turns, lane changes, etc.), and/or over reduced distances. According to example aspects of the present disclosure, the autonomous vehicle 102 can be configured to travel according to a limited operating envelope that takes into account the limited operating capability of the autonomous system when traveling in an autonomous mode.

The vehicle 102 can include a communications system 122 configured to allow the autonomous system 101 (and its computing device(s)) to communicate with other computing devices. The autonomous system 101 can use the communications system 122 to communicate with the operations computing system 104 and/or one or more other remote computing device(s) over the network(s) (e.g., via one or more wireless signal connections). In some implementations, the communications system 122 can allow communication among one or more of the system(s) on-board the vehicle 102. The communications system 122 can include any suitable components for interfacing with one or more network(s), including, for example, transmitters, receivers, ports, controllers, antennas, or other suitable components that can help facilitate communication with one or more remote computing device(s) that are remote from the vehicle 102.

The vehicle 102 can include one or more user-facing computing devices 126 to help control the vehicle 102 based on a passenger-initiated action. The computing device(s) 126 can be, for instance, a tablet, mobile device, display with one or more processors, etc. The computing device(s) 126 can include a display for presenting interface(s) (e.g., GUIs) to a user. The computing device(s) 126 can be included with and/or separate from the autonomous computing system 108 and/or its sub-systems. The computing device(s) 126 can be configured to communicate with one or more of the other components of the vehicle 102 (e.g., of the autonomous system 101). The computing device(s) 126 can include various components for performing various operations and functions. For instance, the computing device(s) 126 can include one or more processor(s) and one or more one or more tangible, non-transitory, computer readable media, each of which are on-board the vehicle 102. The one or more one or more tangible, non-transitory, computer readable media can store instructions that when executed by the one or more processor(s) cause the one or more processor(s) to perform operations and functions.

According to example aspects of the present disclosure, instructions can be sent to the vehicle 102 to autonomously travel (e.g., in a fully autonomous mode) from a first location to a second location. The second location can be a location selected so that a human operator can more easily access the vehicle. Due to limited capabilities of the autonomous system 101, the autonomous vehicle 102 can be restricted to operate within a limited operating envelope during autonomous travel. The limited operating envelope can limit an operating capability of the vehicle 102 based on an operating limit associated with autonomous system 101 for the vehicle 102. For instance, the limited operating envelope can restrict at least one of travel speed, a number of travel maneuvers, a type of travel maneuver, or a travel distance of the vehicle 102.

As an example, a restriction on travel speed can be determined based on a maximum travel speed at which the autonomous system can control the autonomous vehicle to travel autonomously from the first location to the second location (e.g., less than the maximum travel speed). As another example, a restriction on a type of travel maneuver can include a restricted travel maneuver which the autonomous vehicle cannot perform (e.g., no U-turns). As another example, a restriction on travel distance can be determined based on a maximum travel distance at which the autonomous vehicle can travel autonomously (e.g., less than the maximum travel distance).

Once a human operator accesses the vehicle, the vehicle 102 can be operated in a non-autonomous mode outside of the limited operating envelope. For instance, restrictions based on speed, travel maneuvers, travel distance, etc. can be removed so that the human operator can more freely operate the vehicle 102 in a manual mode.

Figure 2:
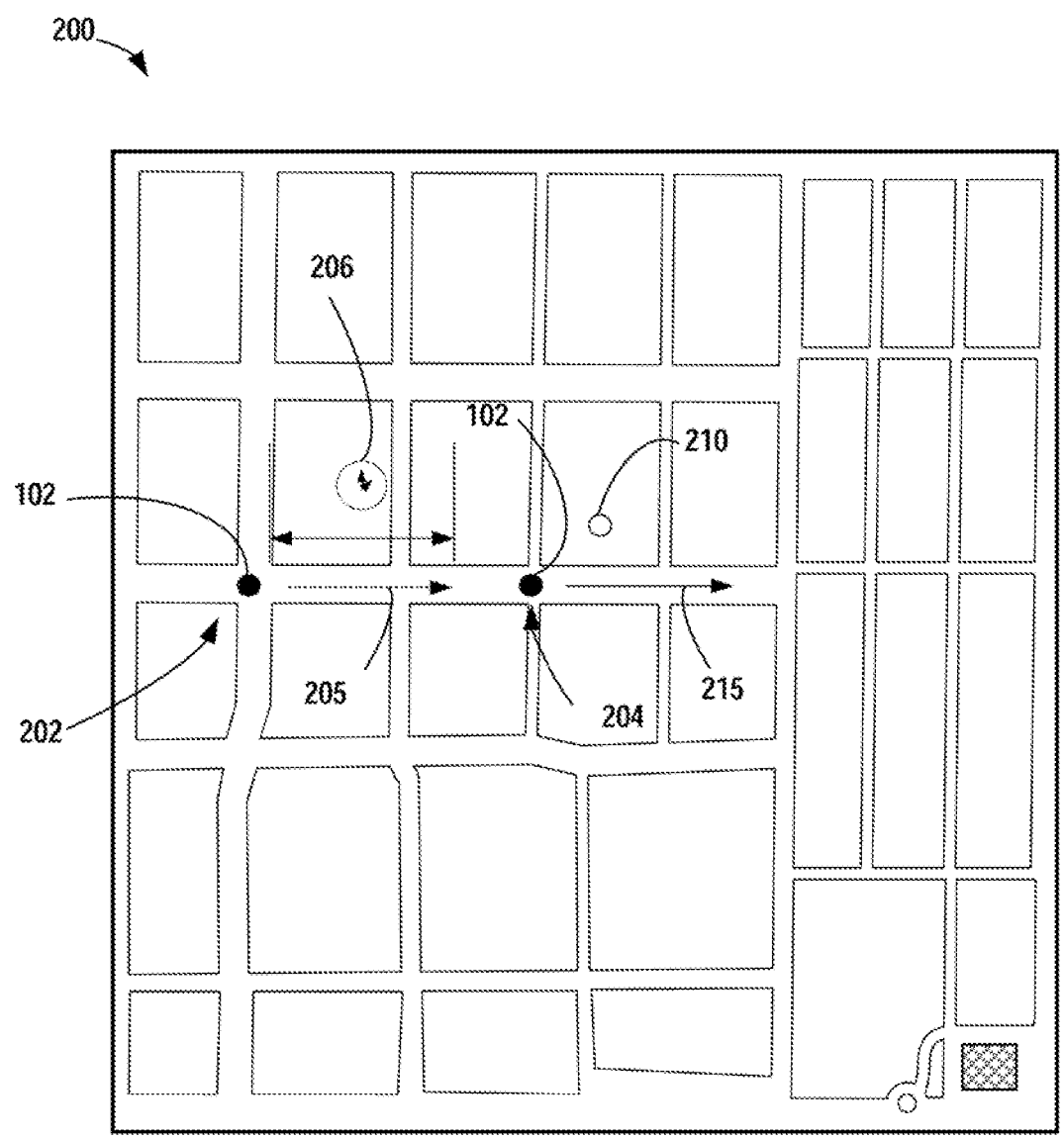
FIG. 2 depicts operation of an example autonomous vehicle according to example embodiments of the present disclosure.

As an example, FIG. 2 depicts a representation of an autonomous vehicle 102 located in a geographic area 200. The autonomous vehicle 102 can receive instructions to travel from a first location 202 to a second location 204 that is proximate a location associated with a human operator 210 (e.g., a driver's home, place of business, etc.). Upon receipt of the instructions, the autonomous vehicle 102 can travel in an autonomous mode according to a limited operating envelope as indicated by arrow 205. Arrow 205 is depicted in broken line to indicate that the autonomous vehicle 102 is restricted to travel according to a limited operating envelope.

As indicated in FIG. 2, in some embodiments, the limited operating envelope may restrict autonomous travel by the autonomous vehicle 102 during a limited time window 206. The limited time window 206 can be determined based on environmental parameters associated with a geographic area (e.g., time of day, traffic patterns, weather, pedestrian traffic, terrain, etc.) and/or operating limits associated with the autonomous vehicle 102 to reduce the impact of autonomous travel. In addition and/or in the alternative, the limited time window 206 can be determined so that the autonomous vehicle is traveling in more ideal conditions (e.g., not during severe weather). In some embodiments, the limited time window 206 can be, for instance, late at night or very early in the morning.

Once the human operator 210 accesses the vehicle at location 204, the system can receive data indicative of a request for operation of the vehicle 102 by the human operator. In response to receiving the data indicative of the request, the vehicle 102 can be authorized for operation in a non-autonomous mode by the human operator outside of the limited operating envelope. The human operator 210 can manually drive the vehicle 102 to an intended destination as indicated by arrow 215. Arrow 215 is depicted in solid line to indicate that the autonomous vehicle is allowed to operate outside of the limited operating envelope.

Figure 3:
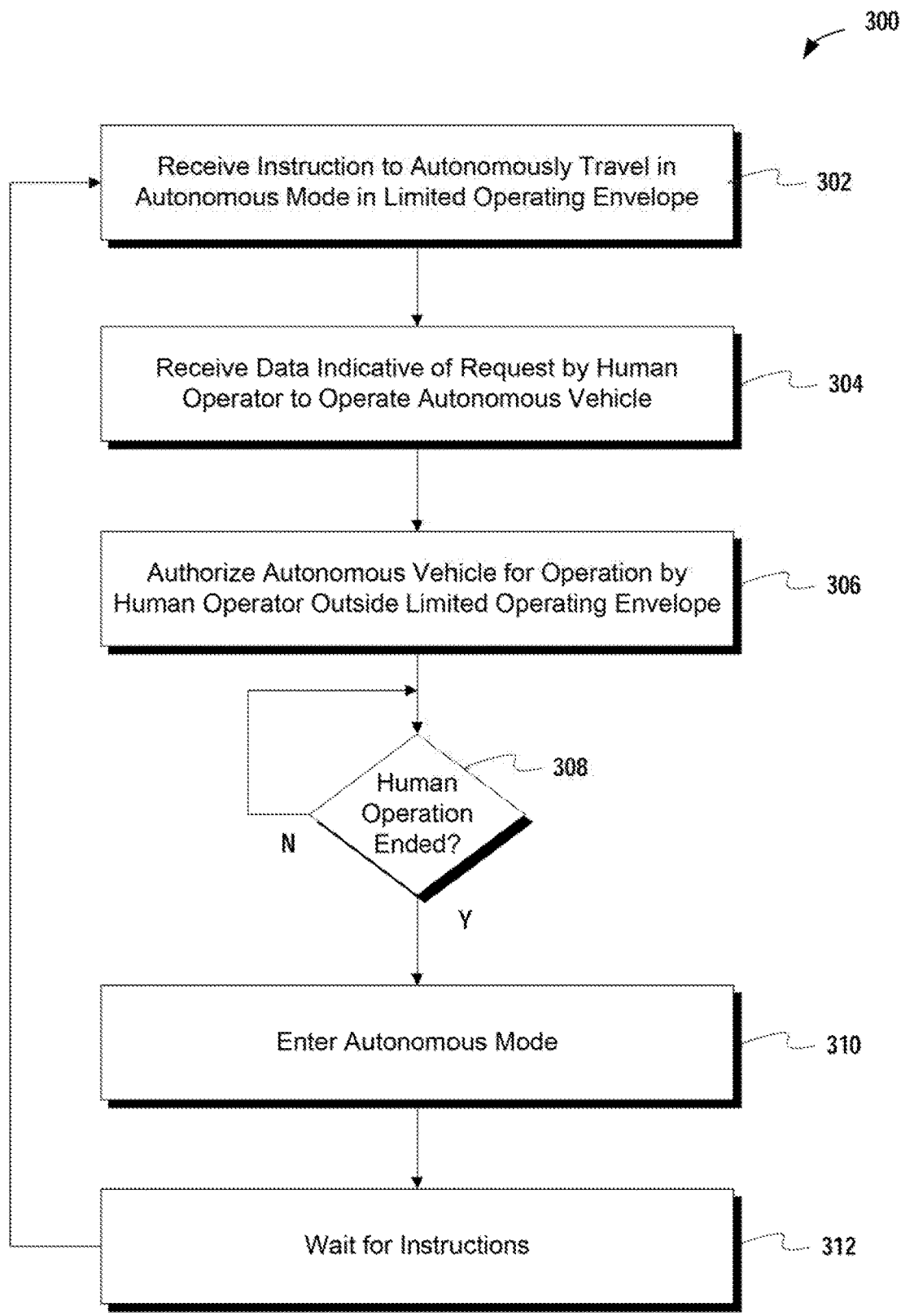
FIG. 3 depicts a flow diagram of an example method for operating an autonomous vehicle according to example embodiments of the present disclosure.

FIG. 3 depicts a flow diagram of example operations associated with a method 300 of controlling an autonomous vehicle according to example embodiments of the present disclosure. The method 300 can be implemented using an autonomous vehicle system, such as the system 100 depicted in FIG. 1. FIG. 3 depicts operations performed in a particular order for purposes of illustration and discussion. Those of ordinary skill in the art, using the disclosures provided herein, will understand that the various steps and/or operations of any of the methods disclosed herein can be adapted, modified, performed simultaneously, expanded, omitted, and/or rearranged without deviating from the scope of the present disclosure.

At (302), the method can include receiving an instruction for an autonomous vehicle to autonomously travel in an autonomous mode (e.g., with no human operator present) from a first location to a second location. The instruction can be received, for instance, at one or more processors associated with an autonomous system of the autonomous vehicle. In some embodiments, the instructions can be received from a computing device located remotely from the vehicle (e.g., an operations computing system) over a network.

The instruction can specify that the autonomous vehicle can travel in the autonomous mode according to a limited operating envelope. As discussed above, the limited operating envelope can restrict autonomous operation of the vehicle based on operating limits associated with the autonomous system. As an example, the limited operating envelope can restrict at least one of travel speed, a number of travel maneuvers, a type of travel maneuver, or a travel distance for the autonomous vehicle. In some embodiments, the limited operating envelope can specify a limited time window for the vehicle to autonomously travel in an autonomous mode. As discussed above, the limited time window can be determined, for instance, to reduce impact or effect on traffic patterns, public use, or other activity for the geographic area.

In some embodiments, the limited time window can be determined, for instance, based at least in part on one or more environmental parameters associated with the geographic area. For instance, the limited time window can be determined based at least in part on environmental parameter(s) such as time of day, traffic patterns, weather, pedestrian traffic, terrain, events, etc. In addition and/or in the alternative, the limited time window can be determined based at least in part on operating limits associated with the autonomous vehicles, such as travel speed limits, etc. For instance, the limited time window can be determined to take into account a reduced travel distance of the autonomous vehicle as a result of reduced operating speed. The limited time window can be determined to implement the reallocation at times suitable for the autonomous vehicles to travel (e.g., with limited operating capability) with reduced impact on the geographic area.

In some embodiments, the time window can be determined using a scoring algorithm. The scoring algorithm can be used to determine times during the day that may be suitable for autonomous travel of autonomous vehicles. For each time or period of time in a day, a score can be computed based on the various parameters associated with operating limits of the autonomous vehicle and/or environmental parameters. When the score for a time or period of time meets a threshold condition, the time or period of time can be included as part of a time window for allocation of autonomous vehicles. Other suitable techniques and/or processes for determining a time window can be used without deviating from the scope of the present disclosure.

At (304), the method can include receiving data indicative of a request by a human operator to operate the autonomous vehicle. In some embodiments, the data indicative of the request can include, for instance, data indicative of a human operator entering the autonomous vehicle (e.g., opening one or more doors and sitting in the driver seat). In some embodiments, the data indicative of the request can be based on a user input via one or more user interfaces. For instance, a user can submit a request to drive the vehicle through interaction with a graphical user interface. The graphical user interface can be presented on a display in the autonomous vehicle and/or on a user device (e.g., smartphone, tablet, wearable device, display with one or more processors, etc.). In some embodiments, the data indicative of the request can include data associated with a human operator starting the autonomous vehicle. Other data indicative of a request by a human operator to operate the vehicle can be received and/or processed without deviating from the scope of the present disclosure.

In response to receiving the data indicative of the request, the operations can include authorizing the autonomous vehicle for operation by a human operator in a non-autonomous mode outside of the limited operating envelope (306). For instance, instructions can be sent to the autonomous vehicle specifying that the autonomous vehicle can be operated in a non-autonomous mode. Restrictions associated with the limited operating envelope can be removed and/or reduced such that the human operator can more freely operate the vehicle in a manual mode to drive to an intended destination.

At (308), the method can include determining that operation of the vehicle by a human operator has ended. For example, various data indicative of human operation can be processed to determine that the human operator is finished with the vehicle. As one example, data indicating that the vehicle has been parked for a threshold period of time can be used to determine that the human operator in no longer operating the vehicle. As another example, data indicating that the driver has reached an intended destination (e.g., as determined from a navigation service) can be used to determine that the human operator is no longer operating the vehicle. As another example, data associated with a user input via one or more interfaces (e.g., graphical user interfaces) can indicate that the human operator no longer needs the vehicle. Other data can be processed to determine that operation of the vehicle by a human operator has ended without deviating from the scope of the present disclosure. As shown in FIG. 3, the vehicle can remain authorized to operate outside the limited operating envelope until it is determined that human operation of the vehicle has ended.

Once it is determined that human operation has ended, the vehicle can enter into an autonomous mode as shown at (310). In some embodiments, the limited operating envelope restrictions can be implemented when the vehicle returns to the autonomous mode. The vehicle can wait for instructions (312) to travel to a new destination in an autonomous mode according to the limited operating envelope. The operations can then repeat based on requests by human operators to operate the autonomous vehicle as shown in FIG. 3.

The example operation of autonomous vehicles according to FIG. 3 can be used for self-driving delivery of vehicles to human operators for a variety of applications. One example application is the allocation of vehicles across a geographic area for use in a vehicle sharing service. For instance, a plurality of vehicles used as part of a vehicle sharing service can autonomously travel or "self-deliver" themselves to various locations in a geographic area to achieve a desired balance or distribution of vehicles across the geographic area. The vehicles can travel under a limited operating envelope while operating in an autonomous mode and self-delivering themselves as part of a reallocation of vehicles.

Figure 4:
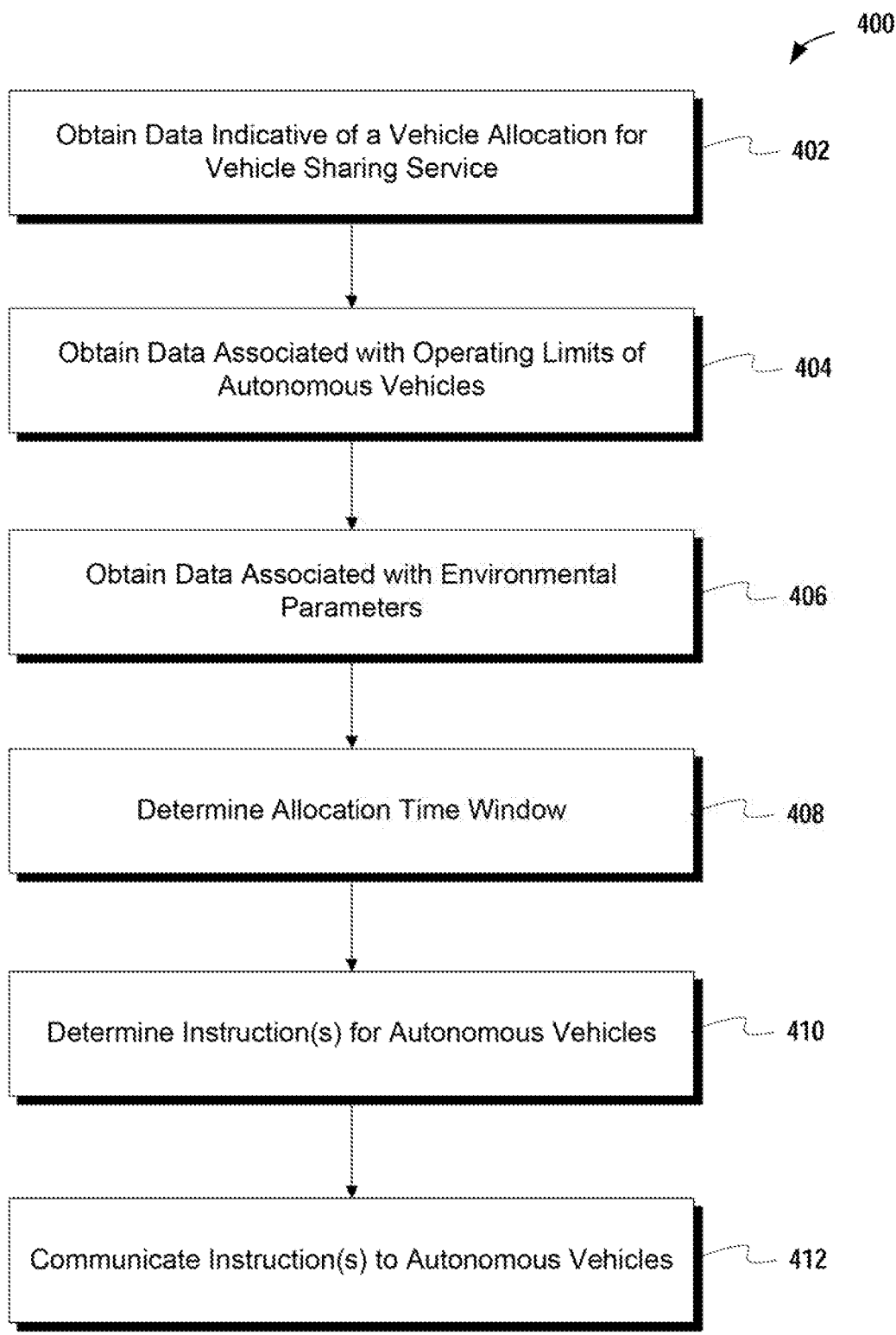
FIG. 4 depicts a flow diagram of an example method for reallocating vehicles in a vehicle sharing service according to example embodiments of the present disclosure.

FIG. 4 depicts an example method 400 of implementing a reallocation of vehicles in a vehicle sharing service according to example aspects of the present disclosure. The method can be implemented using any suitable computing system such as, for instance, the operations computing system 104 of FIG. 1. FIG. 4 depicts operations performed in a particular order for purposes of illustration and discussion. Those of ordinary skill in the art, using the disclosures provided herein, will understand that the various steps and/or operations of any of the methods disclosed herein can be adapted, modified, performed simultaneously, expanded, omitted, and/or rearranged without deviating from the scope of the present disclosure.

At (402), the method can include obtaining data indicative of a vehicle allocation for a vehicle sharing service. The vehicle allocation can specify a location in a geographic area for each of a plurality of vehicles used to implement a vehicle sharing service. The vehicle allocation can be determined based on a variety of factors. For instance, the vehicle allocation can be determined to enhance the vehicle sharing service by locating vehicles in areas where they are easier to access by users of the vehicle sharing service. As an example, the vehicles can be allocated to achieve a desired balance of vehicles across the geographic area (e.g., the vehicles are more evenly distributed across the geographic area). The vehicles can be located closer to mass transit stations. The vehicles can be located closer to locations associated with users of the vehicle sharing service (e.g., at or near a user's home or place of work). As another example, the vehicle allocation can take into account historical pick-up and drop-off locations for vehicles in the vehicle sharing service. In addition and/or in the alternative, the vehicle allocation can specify a location for autonomous vehicles to be serviced.

At (404), the method can include obtaining data associated with operating limits of one or more autonomous vehicles used as part of the vehicle sharing service. As discussed above, certain autonomous vehicles may include autonomous systems with limited operating capability. The data associated with operating limits for an autonomous vehicle can include, for instance, data indicative of limits on travel speed, limits on a number of travel maneuvers, limits on a type of travel maneuver, and/or limits on a travel distance for the autonomous vehicle. The limits can be due to, for instance, reduced operating capabilities of the autonomous system.

At (406), the method can include obtaining data indicative of environmental parameters associated with the geographic area. The environmental parameters can include any parameter that can have an effect on travel and/or transportation in the geographic area. The environmental parameters can include, for instance, time of day, traffic patterns, weather, pedestrian traffic, terrain, events, activities, behavior, etc.

At (408), the method can include determining an allocation time window for allocation of autonomous vehicles in the vehicle sharing service based at least in part on the data associated with the operating limits and/or the data associated with the environmental parameters. The allocation time window can be for a single autonomous vehicle, a subset of all autonomous vehicles in a geographic area used as part of a vehicle sharing service, and/or all of the autonomous vehicles in a geographic area used as part of the vehicle sharing service.

The allocation time window can be determined to reduce impact of the reallocation of autonomous vehicles to achieve the vehicle allocation on the geographic area. For example, the allocation time window can be selected such that the vehicles are not travelling during periods of heavy traffic or activity in the geographic area. In addition and/or in the alternative, the allocation time window can be determined based at least in part on operating limits associated with the autonomous vehicles, such as travel speed limits, etc. The allocation time window can be determined to implement the allocation at times suitable for the autonomous vehicles to travel (e.g., with limited operating capability) with reduced impact on the geographic area.

In some implementations, the time window can be determined using a scoring algorithm. The scoring algorithm can be used to determine times during the day that may be suitable for autonomous travel of autonomous vehicles to implement vehicle allocation in a vehicle sharing service. For each time or period of time in a day, a score can be computed based on the various parameters associated with operating limits of the autonomous vehicle and/or environmental parameters. When the score for a time or period of time meets a threshold condition, the time or period of time can be included as part of a time window for allocation of autonomous vehicles. Other suitable techniques and/or processes for determining a time window can be used without deviating from the scope of the present disclosure.

At (410), the method can include determining instructions for one or more autonomous vehicles to implement the allocation of autonomous vehicles during the allocation time window. For each autonomous vehicle, the instructions can specify an intended destination for the vehicle based on the allocation. The instructions can further specify a limited operating envelope for operation of the autonomous vehicle. As discussed above, the limited operating envelope can be based on or more operating limits for autonomous vehicle. The limited operating envelope can include the allocation time window determined based at least in part on the operating limits for the autonomous vehicle and/or environmental parameters.

At (412), the instructions can be communicated to one or more autonomous vehicles, for instance, over a network. The one or more autonomous vehicles can process the instructions and autonomously travel at least a part of the way to an intended destination for the autonomous vehicle. In some embodiments, the autonomous vehicles can autonomously travel in an autonomous mode according to a limited operating envelope. When accessed by a human operator, the vehicle can be authorized for human operation outside of the limited operating envelope so that the vehicle can be used by a user of the vehicle sharing service.

Figure 5:
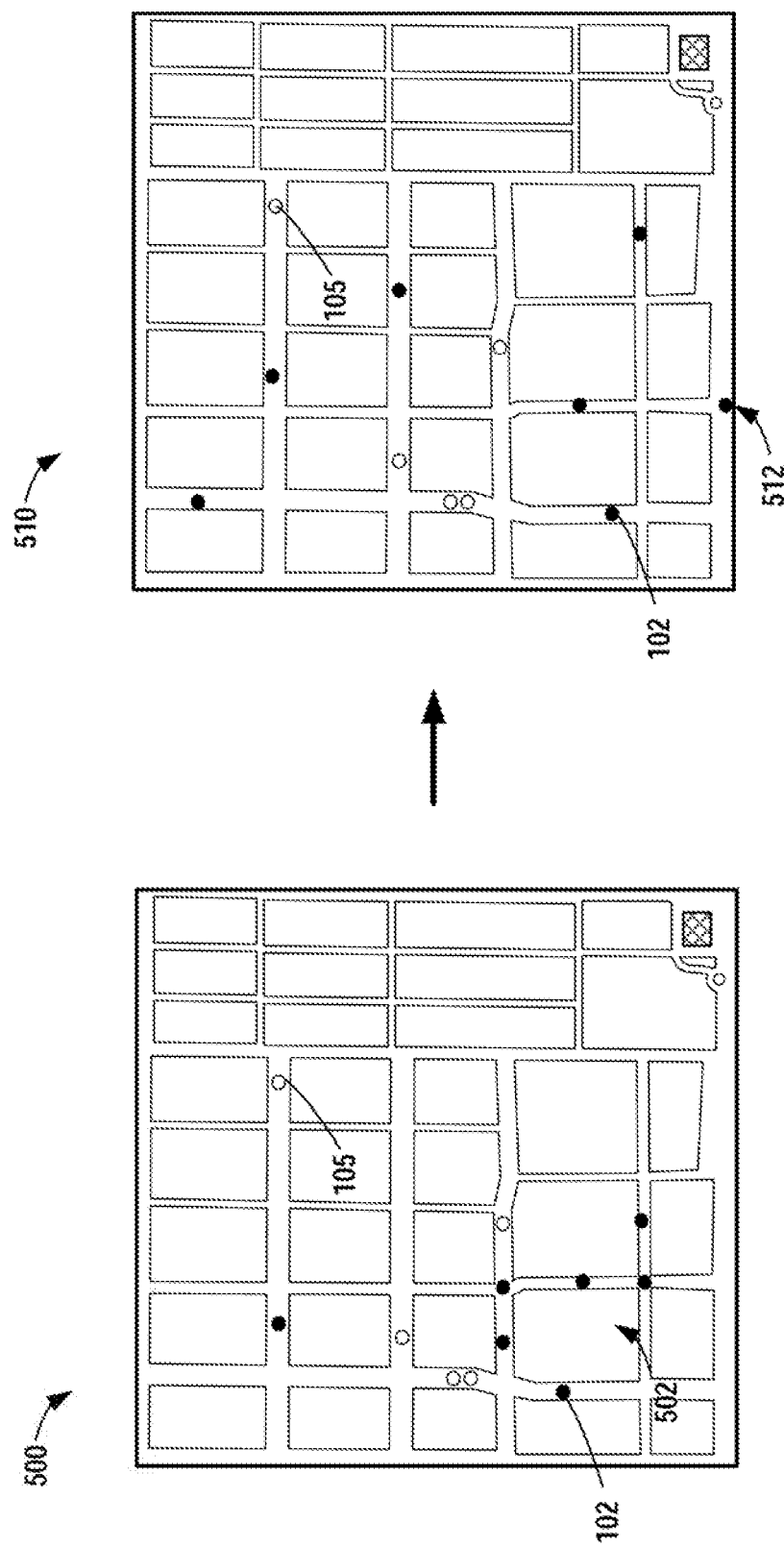
FIG. 5 depicts an example reallocation of vehicles in a vehicle sharing service according to example embodiments of the present disclosure.

FIG. 5 depicts an example reallocation of vehicles for a vehicle sharing service according to example embodiments of the present disclosure. More particularly, FIG. 5 depicts a first allocation 500 of a plurality of vehicles used in a vehicle sharing service in a geographic region. The first allocation 500 can be associated with a first time. The plurality of vehicles can include autonomous vehicles 102 and non-autonomous vehicles 105. The autonomous vehicles 102 are represented by black dots. The non-autonomous vehicles 105 are represented by clear dots.

As shown in the first allocation 500, the vehicles are mostly located in a similar location 502. There are relatively few other vehicles in the rest of the geographic area. Users of the vehicle sharing service that are located too far from location 502 may have difficulty finding or accessing a vehicle to use the vehicle sharing service.

According to aspects of the present disclosure, autonomous vehicles 102 can be instructed to autonomously travel to different locations in the geographic area to achieve a second allocation 510. The second allocation 510 can be associated with a second time that is later than the first time. As shown, the autonomous vehicles 102 have autonomously traveled to different locations in the geographic area to achieve a better balance of vehicles (e.g., more equal distribution) across the geographic area. One autonomous vehicle 102 has traveled to location 512 for servicing and/or maintenance. The non-autonomous vehicles 105 remain in their original locations.

In some embodiments, the autonomous vehicles 102 can be instructed to autonomously travel according to a limited operating envelope to achieve the second allocation 510. The limited operating envelope can include restrictions on, for instance, travel speed, travel distance, maneuvers, etc. When a human operator accesses the vehicle, the vehicle can be authorized to be operated by the human operator outside the limited operating envelope. As discussed above, the limited operating envelope can include a limited allocation time window during which the autonomous vehicles can autonomously travel. The limited allocation time window can be determined to reduce impact of autonomous travel according to a limited operating envelope on the geographic area (e.g., late at night and/or early in the morning).

Figure 6:
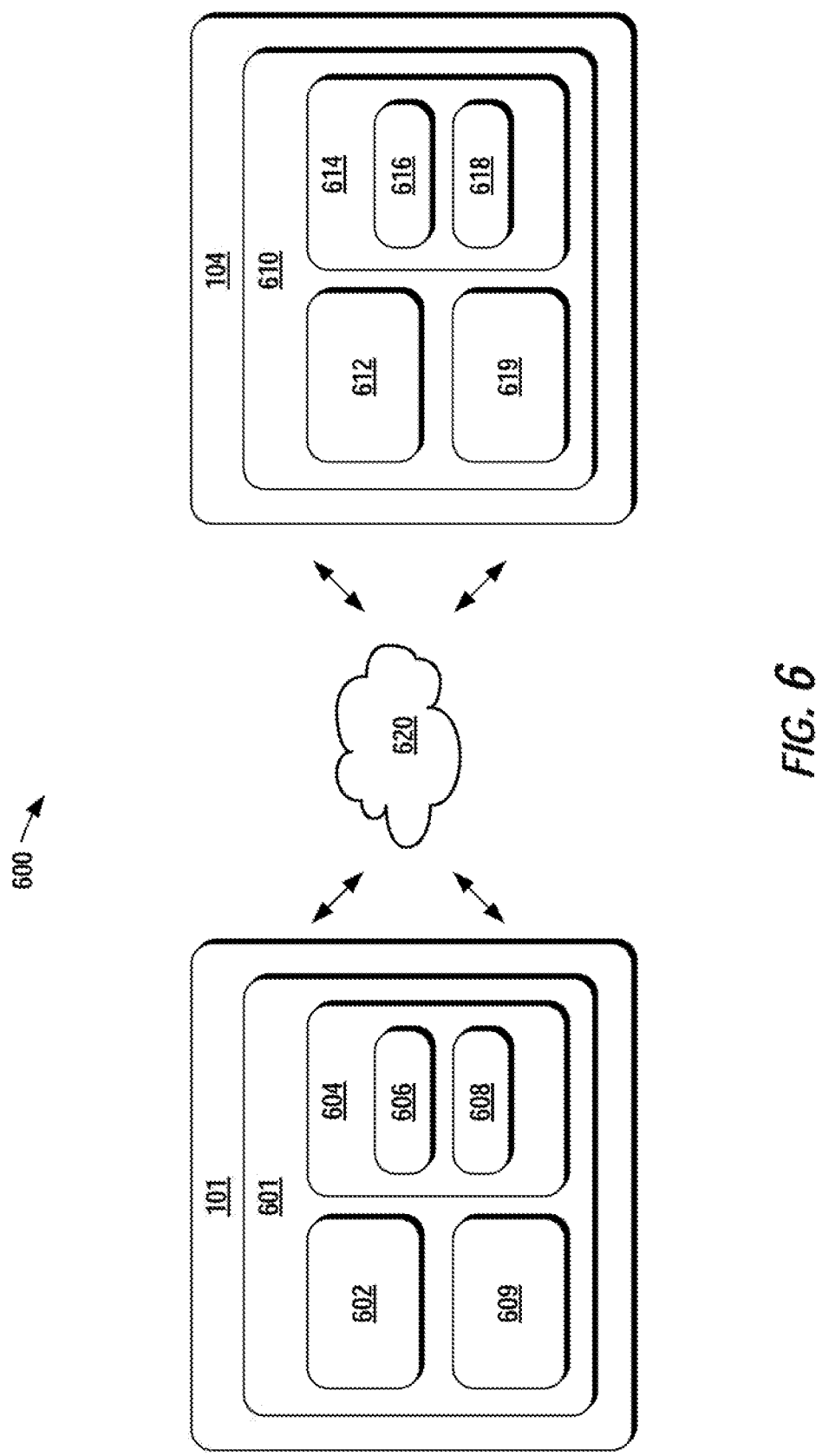
FIG. 6 depicts example system components according to example embodiments of the present disclosure.

FIG. 6 depicts an example computing system 600 according to example embodiments of the present disclosure. The example system 600 illustrated in FIG. 6 is provided as an example only. The components, systems, connections, and/or other aspects illustrated in FIG. 6 are optional and are provided as examples of what is possible, but not required, to implement the present disclosure. The example system 600 can include computing device(s) 610 associated with the autonomous system 101 of the vehicle 102 and, in some implementations, a remote computing system 601 including remote computing device(s) that is remote from the vehicle 102 (e.g., the operations computing system 104) that can be communicatively coupled to one another over one or more networks 620. The remote computing system 610 can be associated with a central operations system and/or an entity associated with the vehicle 102 such as, for example, a vehicle owner, vehicle manager, vehicle share service fleet operator, service provider, etc.

The computing device(s) 601 of the autonomous system 101 can include processor(s) 602 and a memory 604. The one or more processors 602 can be any suitable processing device (e.g., a processor core, a microprocessor, an ASIC, a FPGA, a controller, a microcontroller, etc.) and can be one processor or a plurality of processors that are operatively connected. The memory 604 can include one or more non-transitory computer-readable storage media, such as RAM, ROM, EEPROM, EPROM, one or more memory devices, flash memory devices, etc., and combinations thereof.

The memory 604 can store information that can be accessed by the one or more processors 602. For instance, the memory 604 (e.g., one or more non-transitory computer-readable storage mediums, memory devices) on-board the vehicle 102 can include computer-readable instructions 606 that can be executed by the one or more processors 602. The instructions 606 can be software written in any suitable programming language or can be implemented in hardware. Additionally, or alternatively, the instructions 606 can be executed in logically and/or virtually separate threads on processor(s) 602.

For example, the memory 604 on-board the vehicle 102 can store instructions 606 that when executed by the one or more processors 602 on-board the vehicle 102 cause the one or more processors 602 to perform operations such as any of the operations and functions of the computing device(s) 601 or for which the computing device(s) 601 are configured, as described herein. The memory 604 can store data 608 that can be obtained, received, accessed, written, manipulated, created, and/or stored. In some implementations, the computing device(s) 601 can obtain data from one or more memory device(s) that are remote from the vehicle 102.

The computing device(s) 601 can also include a communication interface 609 used to communicate with one or more other system(s) on-board the vehicle 102 and/or a remote computing device that is remote from the vehicle 102 (e.g., of remote computing system 610). The communication interface 609 can include any circuits, components, software, etc. for communicating with one or more networks (e.g., 620). In some implementations, the communication interface 609 can include, for example, one or more of a communications controller, receiver, transceiver, transmitter, port, conductors, software and/or hardware for communicating data.

The network(s) 620 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 620 can be accomplished, for instance, via a communication interface using any type of protocol, protection scheme, encoding, format, packaging, etc.

The remote computing system 610 can include one or more remote computing devices that are remote from the autonomous system 101. The remote computing devices can include components (e.g., processor(s) 612, memory 614, instructions 616, data 618, communications interface(s) 619, etc.) similar to that described herein for the computing device(s) 601. Moreover, the remote computing system 610 can be configured to perform one or more operations of the operations computing system 104, as described herein.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A method for operating an autonomous vehicle, the method comprising:
    obtaining, by one or more processors, resource data that describes limited processing resources of an autonomous system onboard the autonomous vehicle;
    determining, by the one or more processors and based on the resource data that describes the limited processing resources of the autonomous system onboard the autonomous vehicle, a limited operating envelope that restricts a type of travel maneuver available for the autonomous vehicle traveling from a first location to a second location in an autonomous mode;
    receiving, by the one or more processors, an instruction for the autonomous vehicle to travel in the autonomous mode from the first location to the second location, wherein when operating in the autonomous mode; the autonomous vehicle is to travel from the first location to the second location without a human operator operating the autonomous vehicle;
    after the autonomous vehicle arrives at the second location; receiving, by the one or more processors, data indicative of a request by the human operator to operate the autonomous vehicle; and
    in response to receiving the data indicative of the request by the human operator to operate the autonomous vehicle, authorizing; by the one or more processors, the autonomous vehicle for operation by the human operator in a non-autonomous mode outside of the limited operating envelope.

2. The method of claim 1, wherein the limited operating envelope further restricts at least one of a travel speed, a number of travel maneuvers, or a travel distance of the autonomous vehicle.

3. The method of claim 1, wherein the operating limit associated with the autonomous system comprises a maximum travel speed at which the autonomous system can control the autonomous vehicle to travel autonomously from the first location to the second location.

4. The method of claim 1, wherein the restricted type of travel maneuver comprises at least one of a U-turn or a lane change.

5. The method of claim 1, wherein the limited operating envelope limits autonomous travel by the autonomous vehicle to a limited time window.

6. The method of claim 5, wherein the limited time window is determined based at least in part on one or more environmental parameters.

7. The method of claim 6, wherein the environmental parameters comprise at least one of time of day, traffic patterns, weather, pedestrian traffic, terrain, events, activity, or behavior.

8. The method of claim 1, wherein the instruction is determined based at least in part on a vehicle allocation for a vehicle sharing service.

9. The method of claim 8, wherein the vehicle allocation is determined to achieve a balance of vehicles across a geographic area.

10. The method of claim 1, wherein the data indicative of the request by the human operator to operate the autonomous vehicle comprises data indicative of the human operator starting the autonomous vehicle.

11. The method of claim 1, wherein the resource data that describes the limited processing resources of the autonomous system comprises data describing an intentionally limited processing resource configuration of the autonomous system.

12. An autonomous vehicle, comprising:
    an autonomous system configured to control one or more vehicle components to implement autonomous travel;
    one or more processors; and
    one or more memory devices, the one or more memory devices storing computer-readable instructions that when executed by the one or more processors cause the one or more processors to perform operations, the operations comprising:
    obtaining resource data that describes limited processing resources of an autonomous system onboard the autonomous vehicle;
    determining, based on the resource data that describes the limited processing resources of the autonomous system onboard the autonomous vehicle, a limited operating envelope that restricts a type of travel maneuver available for the autonomous vehicle traveling from a first location to a second location in an autonomous mode:
    receiving an instruction for the autonomous vehicle to travel in an autonomous mode from the first location to the second location, wherein when operating in the autonomous mode, the autonomous vehicle is to travel from the first location to the second location without a human operator operating the autonomous vehicle;
    after the autonomous vehicle arrives at the second location, receiving data indicative of a request by the human operator to operate the autonomous vehicle; and
    in response to receiving the data indicative of the request by the human operator to operate the autonomous vehicle, authorizing the human operator to operate the autonomous vehicle in a non-autonomous mode outside of the limited operating envelope.

13. The autonomous vehicle of claim 12, wherein the limited operating envelope further restricts at least one of a travel speed, a number of travel maneuvers or a travel distance of the autonomous vehicle.

14. The autonomous vehicle of claim 12, wherein the operating limit associated with the autonomous system comprises a maximum travel speed at which the autonomous system can control the autonomous vehicle to travel autonomously from the first location to the second location.

15. The autonomous vehicle of claim 12, wherein the limited operating envelope limits autonomous travel by the autonomous vehicle to a limited time window.

16. The autonomous vehicle of claim 15, wherein the limited time window is determined based at least in part on one or more environmental parameters.

17. The autonomous vehicle of claim 16, wherein the environmental parameters comprise at least one of time of day, traffic patterns, weather, pedestrian traffic, terrain, events, activity, or behavior.

18. A computing system comprising one or more processors and one or more memory devices, the memory devices storing computer-readable instructions that when executed by the one or more processors cause the one or more processors to perform operations, the operations comprising:
obtaining data indicative of a vehicle allocation for a plurality of vehicles across a geographic area, the vehicle allocation specifying a location for each of the plurality of vehicles in the geographic area to implement a vehicle sharing service;
obtaining resource data that describes limited processing resources of an autonomous system onboard the autonomous vehicle;
determining, based on the resource data that describes the limited processing resources of the autonomous system onboard the autonomous vehicle, a limited operating envelope that restricts a type of travel maneuver available for the autonomous vehicle traveling from a first location to a second location in an autonomous mode;
determining an allocation time window for the autonomous vehicle, the allocation time window determined based at least in part on the limited operating envelope;
determining an instruction for the autonomous vehicle based at least in part on the vehicle allocation and the allocation time window, wherein the instruction is configured to control the autonomous vehicle to travel at least partially to a location specified for the autonomous vehicle in the vehicle allocation during the allocation time window in an autonomous mode, and wherein the autonomous vehicle is to travel to the location specified for the autonomous vehicle without a human operator operating the autonomous vehicle; and
communicating the instruction to the autonomous vehicle.

19. The computing system of claim 18, wherein the allocation time window is determined based at least in part on data associated with at least one of time of day, traffic patterns, weather, pedestrian traffic, terrain, events, activity, or behavior.

20. The computing system of claim 18, wherein the human operator has authority to operate the autonomous vehicle outside of the limited operating envelope.

* * * * *